US006832152B1

(12) United States Patent
Bull et al.

(10) Patent No.: US 6,832,152 B1
(45) Date of Patent: Dec. 14, 2004

(54) METHOD AND APPARATUS FOR PROVIDING AN ELECTRONIC CHART WITH AN AIRCRAFT HAVING A FLIGHT MANAGEMENT SYSTEM

(75) Inventors: Ian J. Bull, Cedar Rapids, IA (US); Clive J. Littlechild, Cedar Rapids, IA (US); Stephen R. Johnson, Cedar Rapids, IA (US); Roger D. Burns, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/142,135

(22) Filed: May 9, 2002

(51) Int. Cl.[7] .................................... G06F 17/00
(52) U.S. Cl. .................................... 701/200; 701/14
(58) Field of Search .................................... 701/3, 14, 200, 701/202; 340/973, 971

(56) References Cited

U.S. PATENT DOCUMENTS

| | | | | | |
|---|---|---|---|---|---|
| 4,827,419 | A | * | 5/1989 | Selby, III | 701/200 |
| 6,112,141 | A | * | 8/2000 | Briffe et al. | 701/14 |
| 6,240,341 | B1 | * | 5/2001 | Snyder | 701/3 |
| 6,542,796 | B1 | * | 4/2003 | Gibbs et al. | 701/3 |
| 6,597,294 | B1 | * | 7/2003 | Ariens | 340/995.26 |
| 6,606,544 | B2 | * | 8/2003 | Glenn et al. | 701/3 |

OTHER PUBLICATIONS

George, Fred; Introducing Primus Epic; Business & Commercial Aviation; Nov. 1996; pp. 116–120.*

* cited by examiner

*Primary Examiner*—Michael J. Zanelli
(74) *Attorney, Agent, or Firm*—Nathan O. Jensen; Kyle Eppele

(57) ABSTRACT

An apparatus and method for automatically displaying to a flight crew member a list of electronic charts appropriate for a set flight plan or alternatively displaying the appropriate chart in response to information input into an FMS.

6 Claims, 1 Drawing Sheet

METHOD AND APPARATUS FOR PROVIDING AN ELECTRONIC CHART WITH AN AIRCRAFT HAVING A FLIGHT MANAGEMENT SYSTEM

FIELD OF THE INVENTION

The present invention generally relates to avionics, and more particularly relates to electronic chart systems, and even more particularly relates to automatically providing a flight crew member with information relating to electronic charts in response to input entered into an FMS or vice versa.

BACKGROUND OF THE INVENTION

In the past, designers of avionics systems have endeavored to achieve a reduction in pilot workload and/or an increase in safety of flight.

The cockpit can become, at times, a very busy place. For example, during times when something such as weather or air traffic forces a deviation from a predetermined flight plan, a pilot is often quite busy in avoiding the storm and/or air traffic and simultaneously determining a new flight plan. These problems are compounded when the pilot is also required to use new charts because of the change in flight plan.

For years, printed aviation charts have been commonplace; recently, the charts are being produced as electronic maps and electronic charts to be used by pilots during flight on some on-board electronic library systems. Some of these charts are also now available for handheld touch screen computers carried by pilots or other members of the flight crew. While these electronic charts have some significant advantages over the traditional paper charts, they do have some drawbacks.

One of the primary drawbacks with the electronic library charts or the handheld touch screen charts is difficulty in finding and selecting the appropriate chart among the many electronic charts available on these systems. The problem is exacerbated when the need for a new chart arises during the flight, especially at busy times, such as during approach, etc.

Consequently, there exists a need for improved methods and apparatuses for providing and displaying electronic chart information to a flight crew member.

SUMMARY OF THE INVENTION

It is an object of the present invention to provide an improved means for assisting a pilot with finding and selecting electronic charts.

It is a feature of the present invention to utilize an integrated electronic library system and an FMS.

It is an advantage of the present invention to provide the appropriate chart to a busy pilot without the need for scanning through lists of charts which are unrelated to the current flight plan.

It is another feature of the present invention to include a specifically tailored chart selection menu based upon information input into the FMS.

It is another advantage of the present invention to provide for reduced pilot workload during busy times of changes in flight plans.

It is yet another feature of the present invention to include a database or look-up table (LUT) to associate FMS data, such as airports, Standard Arrivals (STARS), approaches, runways and Standard Instrument Departures (SIDS), etc. with specific electronic library charts.

It is yet another advantage of the present invention to provide for the capability of reducing pilot workloads at critical times, by permitting the pilot to avoid the effort of sorting through many unrelated charts to find the proper chart for the current flight plan.

The present invention is an apparatus and method for aiding a flight crew member with navigating an aircraft after a flight plan has been changed during the course of a flight, which apparatus and method are designed to satisfy the aforementioned needs, provide the previously stated objects, include the above-listed features, and achieve the already articulated advantages. The present invention is carried out in a "pilot rummaging-less" manner in a sense that the undesirable levels of time spent in searching for the appropriate chart for a given flight plan, have been greatly reduced.

Accordingly, the present invention is an integrated FMS and electronic chart system in which the FMS exports information relating to a flight plan and the appropriate electronic charts for that flight plan are automatically either placed in a list of charts to be used during the flight and/or automatically presented to the pilot for immediate viewing.

BRIEF DESCRIPTION OF THE DRAWINGS

The invention may be more fully understood by reading the following description of the preferred embodiments of the invention, in conjunction with the appended drawing wherein.

DETAILED DESCRIPTION

Figure 1:
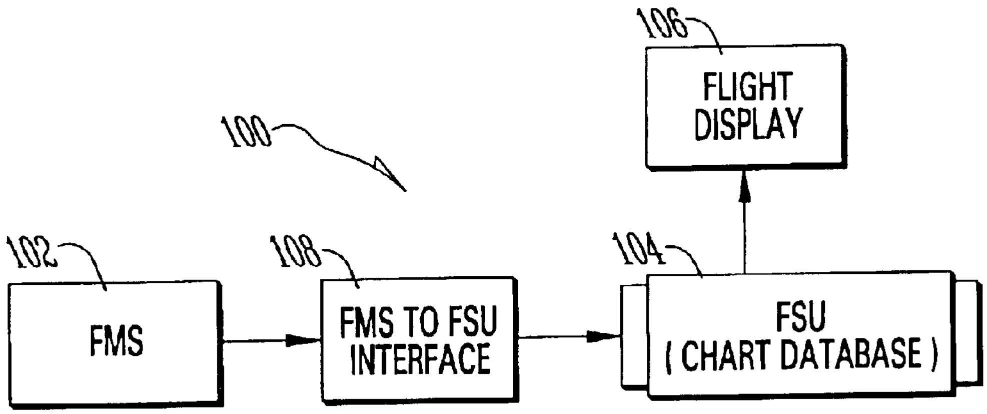
FIG. 1 is a simplified representation of a novel avionics system of the present invention.

Now referring to the drawings wherein like numerals refer to like matter throughout, there is shown in FIG. 1 a system of the present invention, generally designated 100, including an FMS 102, which are well known in the art. FMS 102 can be nearly identical to prior art FMSs except that it will be necessary for the FMS to export additional information relating to the flight plan beyond what is normally provided by an FMS. File server unit (electronic chart database) 104 is a typical electronic device onboard the aircraft often known as an electronic library system or electronic data management system or the like. File server unit (electronic chart database) 104 stores the electronic charts on the aircraft in digital formats. These charts can be provided to the pilot by a multifunctional display (MFD) 106, which are well known in the art. It should be understood that the display need not be a multifunctional display which combines other displays, such as the primary flight displays, etc. A dedicated display could be used to show the charts if desired.

The present invention functions by receiving information about the current flight plan from the FMS 102 and associates that information to the appropriate charts. This step of association is done by FMS to file server unit interface 108. This could be something as simple as a look-up table which cross references the FMS information with the electronic chart information. More specifically, FMS to file server unit interface 108 could take the form of a database/LUT that indexes ARINC 424 FMS navdata to the electronic charts database. In today's environment of integrating numerous previously independent black boxes into a single integrated system, the present invention could be performed by a common microprocessor which performs many functions for such integrated system. Alternatively, FMS to file server unit interface 108 could be an independent piece of hardware designed specifically for the unique requirements of each aircraft type.

It should be understood that while the description of the present invention focuses upon inputting data into an FMS and automatically changing an aviation chart, the reverse could be done as well. For example, a new chart could be pulled up and the FMS could be updated automatically, or at least a suggested change could be input into the FMS once a pilot has confirmed the appropriateness of the suggested change.

Throughout this description, the terms "FMS" and "flight management system" have been used. They are selected because they are believed to readily convey the present invention; however, it should be understood that other on-board avionics equipment could be substituted; for example, a panel mount GPS may include the ability for a pilot to enter waypoints, etc. The present invention is intended to include FMSs, GPSs, and any other flight planning avionics equipment where a pilot might enter information which could be used to automatically aid in later electronic chart selection or vice versa.

Throughout this description, the terms "pilot" and "flight crew" have been used. They are selected because they are believed to readily convey the present invention; however, it should be understood that other persons, other than on-board personnel, could be substituted, for example, flight planners on the ground could utilize a variation of the present invention. It is intended that the present invention and the claims below be read to include all variations of these concepts. The designs shown and described above are merely exemplary of many other designs which could be used with the present invention.

The hardware and software to create the displays of the present invention are either well known in the art, or could be adapted, without undue experimentation, from well-known hardware and software, by persons having ordinary skill in the art, once they have carefully reviewed the description of the present invention included herein.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. An avionics system comprising:

an electronic aviation chart database stored on-board an aircraft;

a display configured to display aviation charts to a member of a flight crew on-board said aircraft;

a navigation/planning system which is configured to receive information from a flight crew member which is representative of portions of a flight plan;

a navigation/planning system to file server unit interface which is configured to associate navigation/planning information with an aviation chart;

wherein said navigation/planning system is an FMS and said navigation/planning system to file server unit interface comprises a look-up table indexing navigation data in an FMS to a database of electronic aviation charts and the navigation/planning system further comprising a microprocessor; and wherein said microprocessor generates a chart selection and causes a chart to be displayed automatically only when replacing a chart already being displayed on said display, wherein said chart selection is responsive to information from a flight crew member which is representative of portions of a flight plan.

2. A system of claim 1 wherein said navigation data in an FMS comprises said information from a flight crew member which is representative of portions of a flight plan.

3. A system of claim 2 wherein said microprocessor generates a list of charts for a flight crew member to select, wherein said list of charts is responsive to said information from a flight crew member which is representative of portions of a flight plan.

4. A method of presenting information to a member of a flight crew comprising the steps of:

inputting flight plan information into a flight management system;

automatically displaying on a cockpit display, in response to said step of inputting flight plan information into a flight management system, information relating to aviation charts;

wherein said information relating to aviation charts comprises a newly displayed aviation chart; and wherein said newly displayed aviation chart is only automatically displayed to a flight crew member when a previous aviation chart was being displayed.

5. A method of claim 4 wherein said step of automatically displaying further comprises a step of using a look-up table.

6. A method of claim 5 wherein said stop of using a look-up table further comprises a step of indexing an ARINC 424 navdata database to an electronic aviation chart database.

* * * * *